(12) United States Patent
Lehmann et al.

(10) Patent No.: US 6,255,935 B1
(45) Date of Patent: Jul. 3, 2001

(54) COUPLING CAPACITOR HAVING AN INTEGRATED CONNECTING CABLE

(75) Inventors: Josef Lehmann, Waldshut (DE); Jakob Rhyner, Zürich (CH); Ate Postma, Küssaberg-Rheinheim; Bernhard Doser, Waldshut, both of (DE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/394,901

(22) Filed: Sep. 13, 1999

(30) Foreign Application Priority Data

Sep. 14, 1998 (DE) .............................. 198 41 864

(51) Int. Cl.$^7$ .............................. H04B 1/00; H04H 5/00
(52) U.S. Cl. .............................. 340/310.07; 340/310.01; 340/310.03; 340/310.08; 333/24 C
(58) Field of Search ........................ 340/310.07, 310.01, 340/310.03, 310.08, 310.05; 333/24 R, 24 C, 24.2; 375/259

(56) References Cited

U.S. PATENT DOCUMENTS

| 3,771,069 | 11/1973 | Levacher et al. ............... 333/24 C |
| 4,142,178 | * 2/1979 | Whyte et al. ................... 307/149 |
| 5,192,231 | * 3/1993 | Dolin, Jr. ....................... 361/111 |
| 5,406,249 | * 4/1995 | Pettus ............................. 340/310.06 |
| 5,559,377 | * 9/1996 | Abraham ........................ 330/149 |

FOREIGN PATENT DOCUMENTS

| 195 10 659 C1 | 3/1995 | (DE) . |
| 196 48 382 C1 | 11/1996 | (DE) . |
| 2 685 562 | 6/1993 | (FR) . |
| 56-007532 | 1/1981 | (JP) . |
| 08264330 | 11/1996 | (JP) . |
| 80/00762 | 4/1980 | (WO) . |

* cited by examiner

Primary Examiner—Donnie L. Crosland
(74) Attorney, Agent, or Firm—Burns, Doane, Swecker & Mathis, L.L.P.

(57) ABSTRACT

The invention relates to a simplified and cost-effective apparatus for injecting signals into electrical power lines at the high-voltage or medium-voltage level. A coupling unit which is simple to assemble and is protected against direct contact is proposed, in which the connecting cable 9 is integrated in the housing 10 of the coupling capacitor 8. In the region where the conductor 20 passes through the grounded housing 10 of the coupling capacitor 8, the electrical field is reduced by means of the housing wall having a special shape 10a. A smooth field distribution is achieved by suitable rounding of the formed region 10a which is provided for the insertion of the connecting cable 9.

12 Claims, 1 Drawing Sheet

COUPLING CAPACITOR HAVING AN INTEGRATED CONNECTING CABLE

BACKGROUND OF THE INVENTION

1. Field of the Invention

The present invention relates to the field of communication via electrical power supply networks. It is based on an apparatus for injecting signals into electrical power lines.

2. Discussion of Background

The use of existing power distribution networks for data communication is of major economic importance. Electricity supply utilities would like, for example, to interrogate devices in the electrical power distribution network without reinstallation of lines and control them remotely, or optimize the utilization of the network by remote interrogation and control of end users.

German Patent Specification DE 196 48 382 C1 discloses a method and an apparatus for transmitting signals via electrical power supply lines, in which communication signals are transmitted via the phase conductor shields of electrical power cables. The signals are modulated onto the shields via inductive couplers. This method is obviously applicable only to electrical power cables having shields, and is unsuitable for unshielded cross country lines. Furthermore, the circuit for a signal transmission device is described, in which the communication signals are infected and/or output via a coupling capacitor to and/or from at least one phase conductor of the electrical power line.

The coupling capacitor (KK) is connected to a phase conductor at the medium-voltage or high-voltage level by means of a connecting cable (AK) through which no current passes. The AK and KK are normally connected outside a housing which surrounds the KK and is grounded. The bushing (which is compatible with medium voltage or high voltage) through this housing comprises means for field reduction, in order to avoid field peaks. A suitable way to achieve this is, for example, by means of a field-controlling layer composed of a material having a high dielectric constant, which layer is arranged as a flexible tube or strip around the electrical power conductor (cable termination). A capacitive field controller disclosed in WO 80/00762 is suitable for bushings through grounded metal walls. This is based on a number of conductive metal foils arranged concentrically around the central conductor.

The connection of the connecting cable to the bushing requires a high level of insulation complexity and occupies a large amount of space. Furthermore, it is not feasible in modern compact switchgear assemblies owing to the excessively short isolation spacings with conventional cable terminations. As a substitute, connections by means of insulated high-voltage coaxial connectors are feasible, but these are expensive and complex to install.

SUMMARY OF THE INVENTION

Accordingly, one object of the invention is to provide a novel, cost-effective, space-saving and efficient apparatus for capacitive signal injection into an overhead line or an electrical power cable of a medium-voltage or high-voltage network. According to the invention.

The essence of the invention is for one end of the insulated connecting cable to be directly integrated in a housing which encloses the coupling capacitor. This avoids the connection mentioned above which is expensive and is complex in terms of insulation. Such integration of an insulated medium-voltage or high-voltage cable in a grounded housing requires field control or field grading in the region of the bushing, that is to say at the point where the cable shield is interrupted. In the present invention, the electrical field is reduced by means of a specific specification for the shape of the housing. Suitable rounding of the formed region (according to the invention) of the housing wall on the cable side results in a field distribution which is not critical.

Known and proven standard components (coupling capacitors (KK) and connecting cables (AK)) can be used to implement the invention. The unit according to the invention and formed from KK and AK is compact and is protected against direct contact, and it is possible to achieve further volume and weight savings by using dry capacitors. The configuration (which is intended to provide field grading) of the housing surrounding the KK can be produced by simple and cost-effective mechanical machining.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
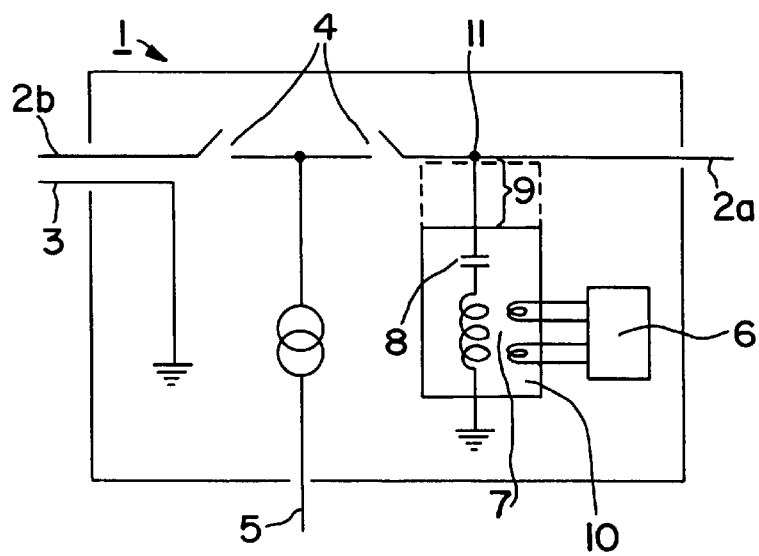
FIG. 1 shows a switching or transformer station having a coupling unit for capacitive signal injection into one phase of an electrical power line.

Referring now to the drawings, wherein like reference numerals designate identical or corresponding parts throughout the several views, FIG. 1 shows a power distribution installation 1, for example a switching station, transformer station or the like, which supplies electrical power via an overhead line or cross country line 2a and/or via an electrical power cable 2b with a shield 3, and passes this electrical power on as required via switches 4 or passes it to a consumer 5. The subject matter of the invention is an apparatus for injecting and outputting signals into and from electrical power lines 2a, 2b of a medium-voltage or high-voltage network. It is now very well known for signals from communication electronics 6 to be supplied to a coupling capacitor 8 (KK) via a signal transformer 7 which is used for impedance matching, and to be capacitively modulated via the KK 8 and a connecting cable 9 (AK) onto a phase conductor of the cross country line 2a or of the electrical power cable 2b. The KK 8 and the signal transformer 7 are often accommodated in a common, grounded housing 10. The contact between the AK 9 and one conductor phase of the electrical power line is made in a connecting point 11. This may be located, for example, on a busbar, or may alternatively be configured as a T-shaped junction piece.

According to the invention, the connecting cable 9 (AK) and the coupling capacitor 8 (KK) are combined to form a unit, which is indicated by a dashed line in FIG. 1. This means that the conductor of the AK 9 is routed directly and permanently into the housing 10 and does not need a special bushing outside the latter. This coupling unit does not require any expensive coaxial connectors, and proven standard components may be used as the KK and AK.

A specific solution has been chosen for field reduction where the AK 9 enters the housing 10, which is grounded in accordance with the regulations. In contrast to the normal situation, the housing 10 is not intended to accommodate a flange to support the actual bushing, but is itself part of the field control mechanism. Comprehensive tests have shown that there is no need for the cylindrical conductor surfaces mentioned initially for the voltages of interest here. Instead of this, it is sufficient for electrical field control for the housing wall on the cable side to be specifically shaped as shown in section in FIG. 2. The edge of the opening that is intended to hold the AK 9 in the housing wall is designed in a funnel shape toward the outside. This formed region 10a, which is provided rotationally symmetrically around the AK 9, merges into the conductor shield 22 of the AK 9. According to the invention, no further conductive surfaces are required for field control in the region of the cable bushing.

The conductor 20 and the conductor insulation 21 are routed into the interior of the housing 10 as far as the KK 8 where, in contrast, the conductor shield 22 is removed over an appropriate length. The area 24 surrounding the KK 8 inside the housing is potted and/or foam-filled with insulation material (for example polyurethane).

The essential feature of the formed region 10a is that a minimum radius of curvature 30 is not infringed so that, in consequence, it is possible to avoid a critical field strength being exceeded. It has been found that this minimum radius is approximately 0.5 cm for all the cable types in question. An even greater minimum radius may, of course, have to be observed in this case for smaller cable diameters.

Figure 2:
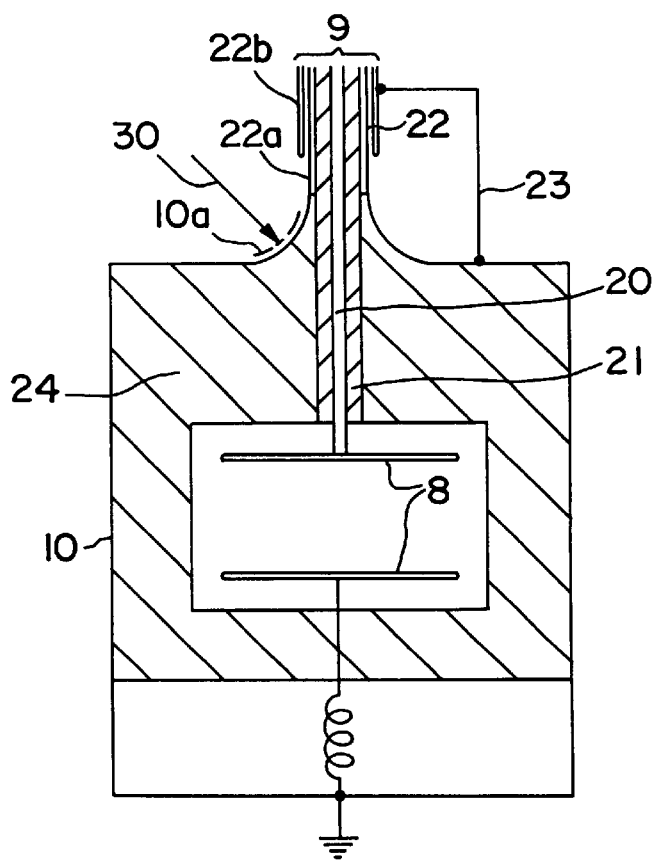
FIG. 2 shows a cross section through the housing of a coupling capacitor having the connecting cable integrated according to the invention.

In medium-voltage or high-voltage cables such as those which have been used as connecting cables in the present case, the shield 22 which is arranged concentrically around the conductor comprises a first conductive sheath 22a, which is preferably manufactured from a carbon-filled polymer, and, above this and as a second layer 22b, a metallic wire mesh or a metallic binding, or some other solid conductor. In this case, as indicated in FIG. 2, the outer layer 22b is connected to the housing 10 via an additional ground connection 23. The direct electrical contact between the cable shield and the capacitor housing 10a is produced via the first conductive layer 22a.

FIG. 1 shows a power distribution installation 1, in which the connecting point 11 of the AK is located on the phase of the cross country line 2a. Apart from cross country lines 2a, the invention can also be used with electrical power cables 2b having grounded cable or phase shields 3. The figures show only one unit according to the invention for coupling to one phase of the electrical power line. However, each phase (R, Y, B) of the electrical power line 2a, 2b is preferably connected to in each case one coupling unit.

Important advantages of the coupling unit according to the invention and comprising the AK and KK relate to its simple assembly and installation, and the geometric flexibility of the connecting cable. The completely encapsulated form of the coupling unit, which provides protection against direct contact, allows it to be installed in any existing switching or transformer station. The invention is particularly highly suitable for digital signal transmission via the phases of high-voltage and medium-voltage lines.

Obviously, numerous modifications and variations of the present invention are possible in light of the above teachings. It is therefore to be understood that, within the scope of the appended claims, the invention may be practiced otherwise than as specifically described herein.

What is claimed as new is:

1. An apparatus for capacitive injection of communication signals into a phase conductor of an electrical power line of a medium-voltage or high-voltage network, comprising:
    a) a coupling capacitor in a grounded housing and
    b) a connecting cable having a first conductor and a conductor shield, wherein the first conductor is connected to a point on a phase conductor of the electrical power line, wherein
    c) the first conductor is routed into the interior of the grounded housing and is connected to the coupling capacitor, and wherein
    d) the conductor shield of the connecting cable is conductively connected to the grounded housing.

2. The apparatus as claimed in claim 1, wherein, for field control, the grounded housing has a formed region which is formed essentially rotationally symmetrically around the connecting cable.

3. The apparatus as claimed in claim 2, wherein the formed region tapers continuously toward the outside.

4. The apparatus as claimed in claim 3, wherein a radius of curvature at each point in the formed region and in a plane containing the first conductor is not less than a minimum radius of curvature of 0.5 centimeters.

5. The apparatus as claimed in claim 4, wherein the interior of the grounded housing is potted and/or foam-filled with an electrically insulating material.

6. The apparatus as claimed in claim 1, wherein the conductor shield of the connecting cable comprises an inner conductive layer and an outer conductive layer wherein the outer conductive layer is in contact with the grounded housing via a ground connection.

7. The apparatus as claimed in claim 1, wherein the coupling capacitor is a dry capacitor.

8. The apparatus as claimed in claim 1, wherein a signal transformer is likewise accommodated in the housing.

9. The apparatus as claimed in claim 1, wherein the apparatus is arranged in the interior of a power distribution installation.

10. The apparatus of claim 7, wherein the coupling capacitor is a foil capacitor.

11. The apparatus of claim 7, wherein the coupling capacitor is a ceramic capacitor.

12. A power distribution installation comprising an apparatus for capacitive injection of communication signals into a phase conductor of an electrical power line of a medium-voltage or high-voltage network,
    wherein the apparatus is arranged in an interior of the power distribution installation, and
    wherein the apparatus comprises a coupling capacitor in a grounded housing and a connecting cable having a first conductor and a conductor shield, wherein the first conductor is connected to a point on a phase conductor of the electrical power line, wherein the first conductor is routed into the interior of the grounded housing and is connected to the coupling capacitor, and wherein the conductor shield of the connecting cable is conductively connected to the grounded housing.

* * * * *